United States Patent
Li

(10) Patent No.: US 11,765,258 B2
(45) Date of Patent: Sep. 19, 2023

(54) MOBILE TERMINAL AND METHOD FOR CONTROLLING MOBILE TERMINAL

(71) Applicant: GUANGDONG OPPO MOBILE TELECOMMUNICATIONS CORP., LTD., Guangdong (CN)

(72) Inventor: Biao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 117 days.

(21) Appl. No.: 17/473,975

(22) Filed: Sep. 13, 2021

(65) Prior Publication Data

US 2021/0409526 A1 Dec. 30, 2021

Related U.S. Application Data

(63) Continuation of application No. PCT/CN2019/089693, filed on May 31, 2019.

(30) Foreign Application Priority Data

Mar. 14, 2019 (CN) .......................... 201920329811.4

(51) Int. Cl.
*H04M 1/02* (2006.01)
(52) U.S. Cl.
CPC .................................. *H04M 1/026* (2013.01)
(58) Field of Classification Search
CPC .. H04M 1/026; H04M 1/0214; H04M 1/0241; H04M 1/0247; H04M 1/04;
(Continued)

(56) References Cited

U.S. PATENT DOCUMENTS

| 8,665,589 B2 * | 3/2014 | Lin | ...................... G06F 3/0202 |
| | | | 361/679.41 |
| 2005/0200608 A1 * | 9/2005 | Ulla | ...................... G06F 3/0231 |
| | | | 345/168 |

(Continued)

FOREIGN PATENT DOCUMENTS

| CN | 103069356 | 4/2013 |
| CN | 104166430 A | 11/2014 |

(Continued)

OTHER PUBLICATIONS

EPO, Extended European Search Report for EP 19919337.6, dated Apr. 8, 2022.

(Continued)

*Primary Examiner* — Marisol Figueroa
(74) *Attorney, Agent, or Firm* — Hodgson Russ LLP

(57) ABSTRACT

Disclosed are a mobile terminal and a method for controlling the same. The mobile terminal includes a master device and a slave device detachably mounted on the master device. The master device includes a housing, a bracket, a master controller and a switch assembly. The housing is provided with a groove to receive the bracket. The bracket can be rotated into or out of the groove relative to the housing. The switch assembly is arranged on the housing and directly faces the groove. When the bracket is rotated out of the groove relative to the housing and the rotation angle thereof meets a first angle, the switch assembly generates a first signal and sends it to the master controller. The master controller controls, according to the first signal, at least one component of the master device to be switched to a first usage state.

19 Claims, 11 Drawing Sheets

(58) Field of Classification Search
CPC ......... H04M 1/72412; H04M 1/72454; H04M 1/0256; G06F 1/1616; G06F 1/1632
See application file for complete search history.

(56) References Cited

U.S. PATENT DOCUMENTS

| | | | |
|---|---|---|---|
| 2014/0355196 | A1 | 12/2014 | Hashimoto et al. |
| 2016/0091934 | A1 | 3/2016 | Oakley |
| 2018/0203484 | A1* | 7/2018 | Lee ..................... G06F 1/1667 |
| 2019/0033984 | A1 | 1/2019 | Seo et al. |

FOREIGN PATENT DOCUMENTS

| | | |
|---|---|---|
| CN | 104767843 | 7/2015 |
| CN | 206237474 | 6/2017 |
| CN | 108073225 | 5/2018 |

OTHER PUBLICATIONS

CNIPA, First Office Action for CN Application No. 201980087793.6, dated Jan. 17, 2022.
CNIPA, Second Office Action for CN Application No. 201980087793.6, dated Jul. 12, 2022.
WIPO, International Search Report for PCT Application No. PCT/CN2019/089693, dated Dec. 9, 2019.

* cited by examiner

MOBILE TERMINAL AND METHOD FOR CONTROLLING MOBILE TERMINAL

CROSS-REFERENCE TO RELATED APPLICATION

This application is a continuation of International Application PCT/CN2019/089693, filed May 31, 2019, which claims priority to Chinese Patent Application No. 201920329811.4, filed Mar. 14, 2019. The entire disclosures of the aforementioned applications are incorporated herein by reference.

TECHNICAL FIELD

The present disclosure relates to the technical field of mobile terminals, and particularly to a mobile terminal and a method of controlling the mobile terminal.

BACKGROUND

With the development of mobile terminal technologies, people desire the mobile phones to be thinner and lighter, for ease of use and carrying. Accordingly, in order to enable the mobile phones to be thinner and lighter, the mobile phone in the related art is provided in two parts. However, since the mobile phone in the related art is divided into two parts, the mobile terminal has a single function, failing to meet the requirements of the users.

SUMMARY

Embodiments of the present disclosure provide a mobile terminal and a method for controlling the same.

The embodiments of the present disclosure provide a mobile terminal. The mobile terminal includes a master device and a slave device. The slave device is detachably installed on the master device. The master device includes a housing, a bracket, a master controller and a switch assembly. The housing is provided with a groove configured to receive the bracket. The bracket is capable of being rotated into or out of the groove relative to the housing. The master controller is arranged inside the housing. The switch assembly is connected with the master controller. The switch assembly is arranged in the housing and faces the groove.

When the bracket is rotated out of the groove relative to the housing and the angle of rotation meets first angle, the switch assembly generates a first signal and sends the first signal to the master controller. The master controller is configured to control, according to the first signal, at least one component of the master device to be switched to a first usage state.

The embodiments of the present disclosure provide a method for controlling a mobile terminal. The mobile terminal includes a master device and a slave device. The slave device is detachably installed on the master device. The master device includes a housing, a bracket, a master controller and a switch assembly. The housing is provided with a groove configured to receive the bracket. The bracket is capable of being rotated into or out of the groove relative to the housing. The master controller is arranged inside the housing. The switch assembly is connected with the master controller. The switch assembly is arranged in the housing and faces the groove.

The method includes operations as follows:

generating a first signal by the switch assembly, when the bracket is rotated out of the groove relative to the housing and an angle of rotation of the bracket meets first angle;

receiving the first signal by the master controller; and controlling by the master controller, according to the first signal, at least one component of the master device to be switched to a first usage state.

The embodiments of the present disclosure provide a mobile terminal. The mobile terminal includes a housing, a bracket, a master controller and a switch assembly. The housing is provided with a groove configured to receive the bracket. The bracket is capable of being rotated into or out of the groove relative to the housing. The master controller is arranged inside the housing. The switch assembly is connected with the master controller. The switch assembly is arranged in the housing and faces the groove.

When the bracket is rotated out of the groove relative to the housing and the angle of rotation meets first angle, the switch assembly generates a first signal and sends the first signal to the master controller. The master controller is configured to control, according to the first signal, at least one component of the mobile terminal to be switched to a first usage state.

The embodiments of the present disclosure provide a method for controlling a mobile terminal. The mobile terminal includes a housing, a bracket, a master controller and a switch assembly. The housing is provided with a groove configured to receive the bracket. The bracket is capable of being rotated into or out of the groove relative to the housing. The master controller is arranged inside the housing. The switch assembly is connected with the master controller. The switch assembly is arranged in the housing and faces the groove.

The control method includes:

generating a first signal by the switch assembly, when the bracket is rotated out of the groove relative to the housing and an angle of rotation of the bracket meets first angle;

receiving the first signal by the master controller; and controlling by the master controller, according to the first signal, at least one component of the mobile terminal to be switched to a first usage state.

BRIEF DESCRIPTION OF THE DRAWINGS

In order to explain the technical solutions of the present disclosure more clearly, drawings that need to be used in the embodiments will be briefly introduced in the following. Obviously, the drawings in the following illustrate only some embodiments of the present disclosure; and based on these drawings, those skilled in the art can also obtain other drawings without paying any inventive work.

DETAILED DESCRIPTION OF PREFERRED EMBODIMENTS

The technical solutions in the embodiments of the present disclosure will be clearly and completely described below in conjunction with the drawings in the embodiments of the present disclosure.

In order to understand the above objects, features and advantages of the present disclosure more clearly, the present disclosure will be described in detail below with reference to the drawings and specific embodiments. It should be noted that the embodiments of the present disclosure and the features in the embodiments can be combined with each other without conflict.

In the following description, many specific details are set forth in order to fully understand the present disclosure. The described embodiments are only a part rather than all of the embodiments of the present disclosure. All other embodiments, which are obtained by those of ordinary skill in the art based on the embodiments in this disclosure without paying any creative work, shall fall within the scope of this disclosure.

Figure 1:
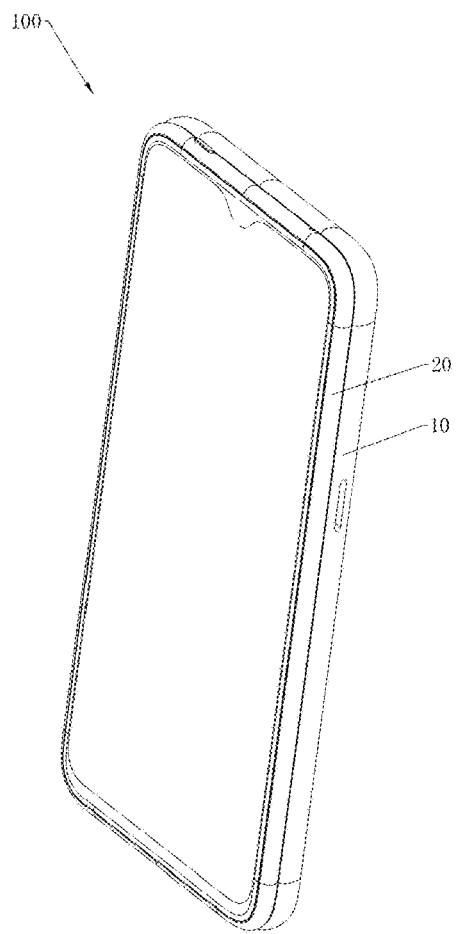
FIG. 1 is a schematic structural diagram illustrating a mobile terminal in one usage state according to embodiments of the present disclosure.
Figure 2:
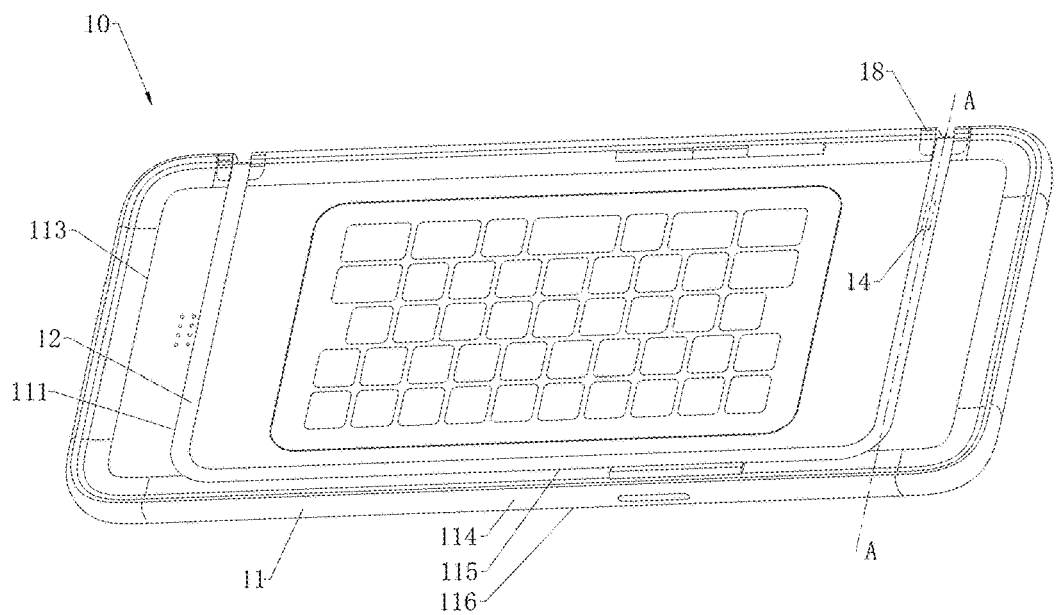
FIG. 2 is a schematic structural diagram illustrating a master device of the mobile terminal shown in FIG. 1, in which the master device is in one usage state.
Figure 3:
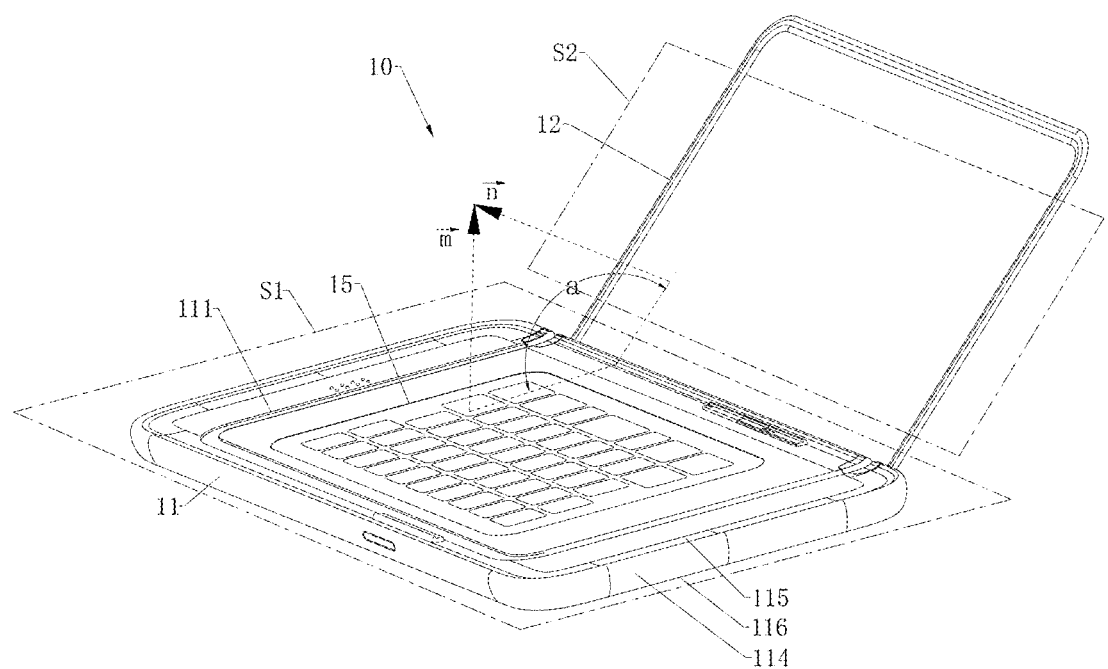
FIG. 3 is a schematic structural diagram illustrating the master device of the mobile terminal shown in FIG. 1, in which the master device is in another usage state.
Figure 4:
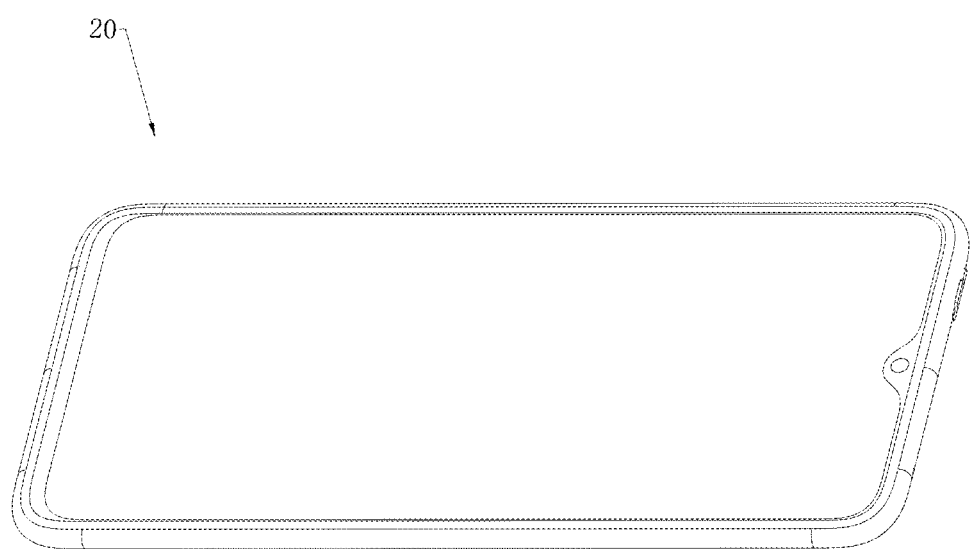
FIG. 4 is a schematic structural diagram illustrating a slave device of the mobile terminal shown in FIG. 1.

Referring to FIG. 1 to FIG. 4, FIG. 1 illustrates a mobile terminal 100 provided by the embodiments of the disclosure; FIG. 2 is a schematic structural diagram illustrating a master device 10 of the mobile terminal 100 shown in FIG. 1, in which the master device is in one usage state; FIG. 3 is a schematic structural diagram illustrating the master device 10 of the mobile terminal 100 shown in FIG. 1, in which the master device is in another usage state; and FIG. 4 is a schematic structural diagram illustrating a slave device 20 of the mobile terminal 100 shown in FIG. 1. The mobile terminal 100 includes a master device 10 and a slave device 20. The slave device 20 is capable of being detachably installed on the master device 10. It can be understood that, with regard to the installing of the slave device 20 on the master device 10, it means that the slave device 20 can be directly placed on the master device 10, or the slave device 20 can be detachably fixed on the master device 10 through fasteners, or the slave device 20 can be slidably or rotatably connected onto the master device 10.

Figure 5:
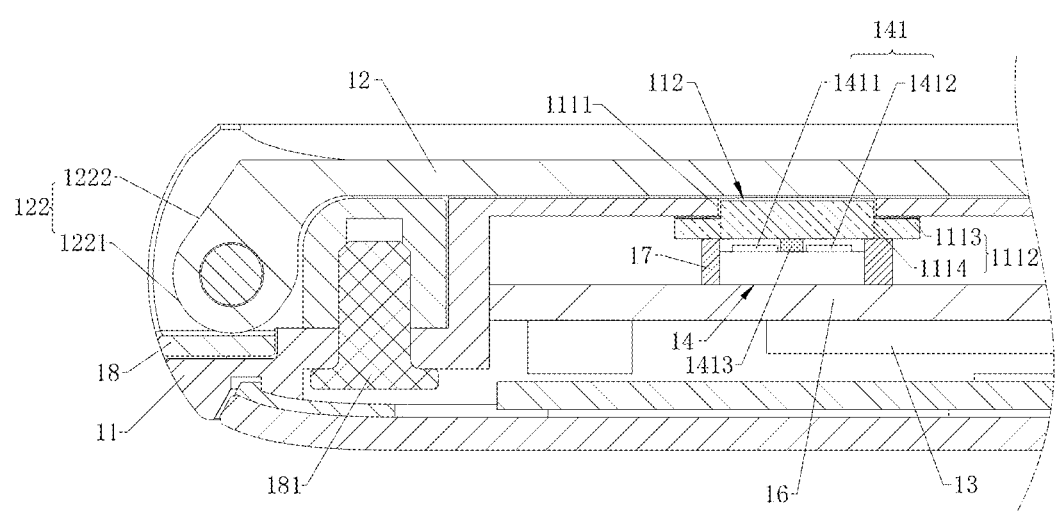
FIG. 5 is a partial cross-sectional view schematically illustrating an implementation of the master device shown in FIG. 2, which is taken along line A-A.

Furthermore, referring to FIG. 2, FIG. 3 and FIG. 5, the master device 10 includes a housing 11, a bracket 12, a master controller 13 and a switch assembly 14. The switch assembly 14 of FIG. 5 is schematically represented by a photoelectric sensor 141 below. However, the switch assembly 14 is not limited to the photoelectric sensor 141 shown in FIG. 5. The housing 11 is provided with a groove 111 configured to receive the bracket. The groove 111 may be substantially in a U-shape, and the bracket 12 has a shape matching that of the groove. The bracket 12 is capable of being rotated into or out of the groove 111 relative to the housing 11. Optionally, when the bracket 12 is rotated into the groove 111, the bracket 12 is completely located in the groove 111, so that the appearance of the master device 10 is tidy. It can be understood that, with regard to the bracket 12 being completely located in the groove 111, it means that the size of the bracket 12 is approximately equal to the size of the groove 111. When the bracket 12 is rotated into the groove 111, the groove 111 is fully occupied by the bracket 12. The master controller 13 is provided inside the housing 11. The switch assembly 14 is connected with the master controller 13. The switch assembly 14 is arranged in the housing 11 and faces directly the groove 111. It can be understood that, when the switch assembly 14 is connected with the master controller 13, a signal can be transmitted between the master controller 13 the switch assembly 14.

Furthermore, as shown in FIG. 3, when the bracket 12 is rotated out of the groove 111 relative to the housing 11, and the angle of rotation α meets a first angle, the switch assembly 14 generates a first signal and sends the first signal to the master controller 13. The master controller 13 is configured to control, according to the first signal, at least one component of the master device 10 to be switched to a first usage state. It can be understood that the master device 10 includes a peripheral surface 114, a first surface 115 and a second surface 116, where the first surface 115 and the second surface 116 are disposed opposite to each other and located at two sides of the peripheral surface 114. The groove 111 is provided on the first surface 115. A normal vector of a plane S1 where the planar portion of the first surface 115 is located is $\vec{m}$. A normal vector of a plane S2, where the bracket 12 is located and which faces the planar portion of the first surface 115, is $\vec{n}$. The supplementary angle of an included angle between the normal vector $\vec{m}$ and the normal vector $\vec{n}$ defines the angle of rotation α. Optionally, the master controller 13 has a database. Upon acquiring the first signal, the master controller 13 processes the first signal to obtain a data signal, and searches the database for a match between the data signal and the data stored in the database. Upon successfully searching out the data matching the data signal, the master controller 13 sends an electrical signal to at least one component of the master device 10, to make the at least one component switched to the first usage state.

In the embodiments, the switch assembly 14 is provided in the housing 11, and the switch assembly 14 faces directly the groove 111. In this way, when the bracket 12 is rotated out of the groove 111 relative to the housing 11, and the angle of rotation α meets the first angle, the switch assembly 14 can generate the first signal and send the first signal to the master controller 13, and the master controller 13 can control, according to the first signal, at least one component of the master device 10 to be switched to the first usage state. Accordingly, the usage state of the at least one component of the mobile terminal 100 can be correlated with the rotation of the bracket 12, and the function of the bracket 12 are thus diversified, which makes the mobile terminal 100 more convenient for the user to use, and provides better user experience of the mobile terminal 100.

Figure 6:
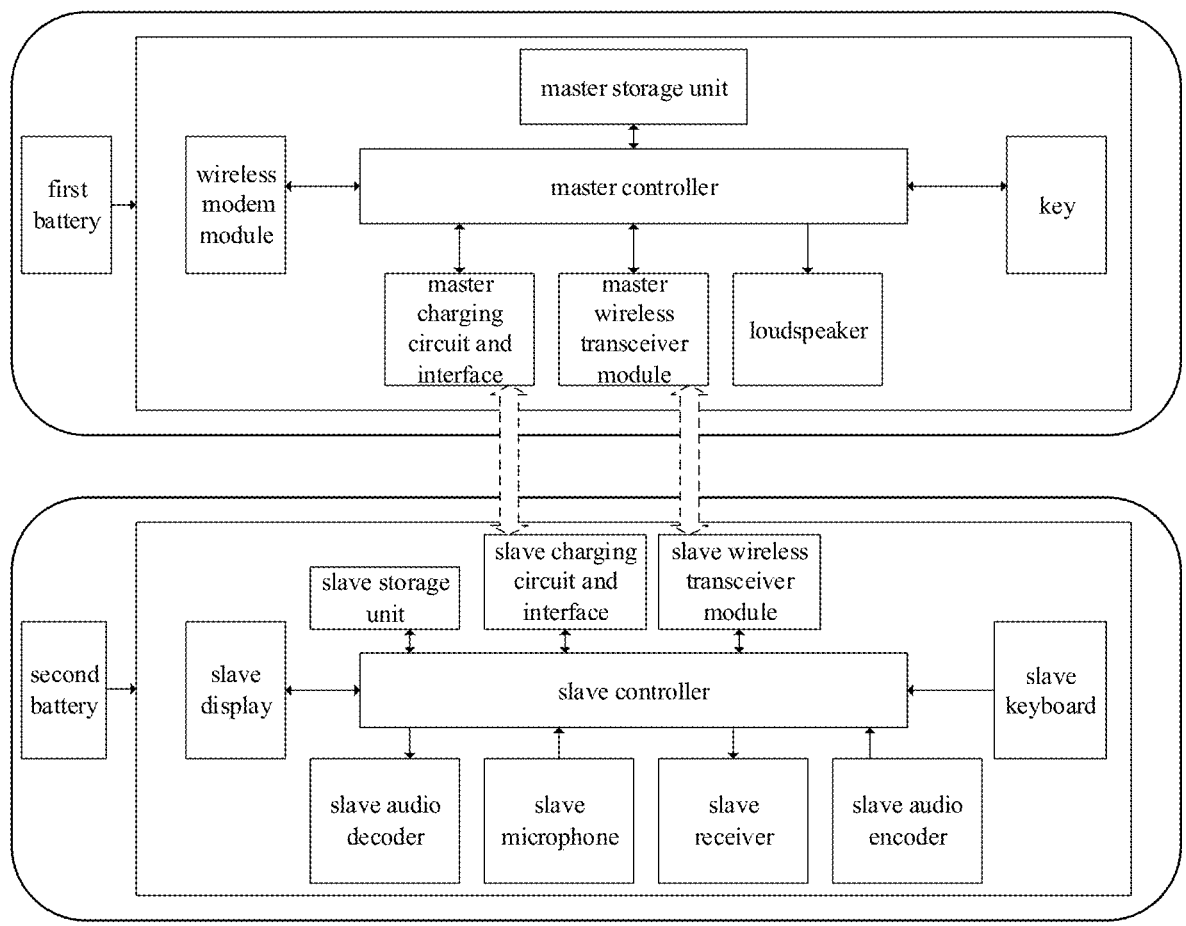
FIG. 6 is a block diagram illustrating the hardware structure of an implementation of the mobile terminal shown in FIG. 1.

In the embodiments, FIG. 6 is a block diagram illustrating the hardware structure of an implementation of the mobile terminal 100. The communication between the master device 10 and the slave device 20 may be implemented in many ways.

In a first implementation, as shown in FIG. 6, the master device 10 includes a wireless modem module and a master wireless transceiver module. The slave device 20 includes a slave keyboard, a slave controller, and a slave wireless transceiver module communicating with the master wireless transceiver module. In which, the master device 10 may include a first battery for powering various component of the master device 10, such as a loudspeaker, keys and the master controller. The master device 10 may also include a master charging circuit and interface for charging the first battery. Similarly, the slave device 20 may include a second battery for powering various component of the slave device 20, and may also include a slave charging circuit and interface for charging the second battery. The master charging circuit and interface may be connected with the slave charging circuit and interface when the master device 10 and the slave device 20 communicate.

Figure 7:
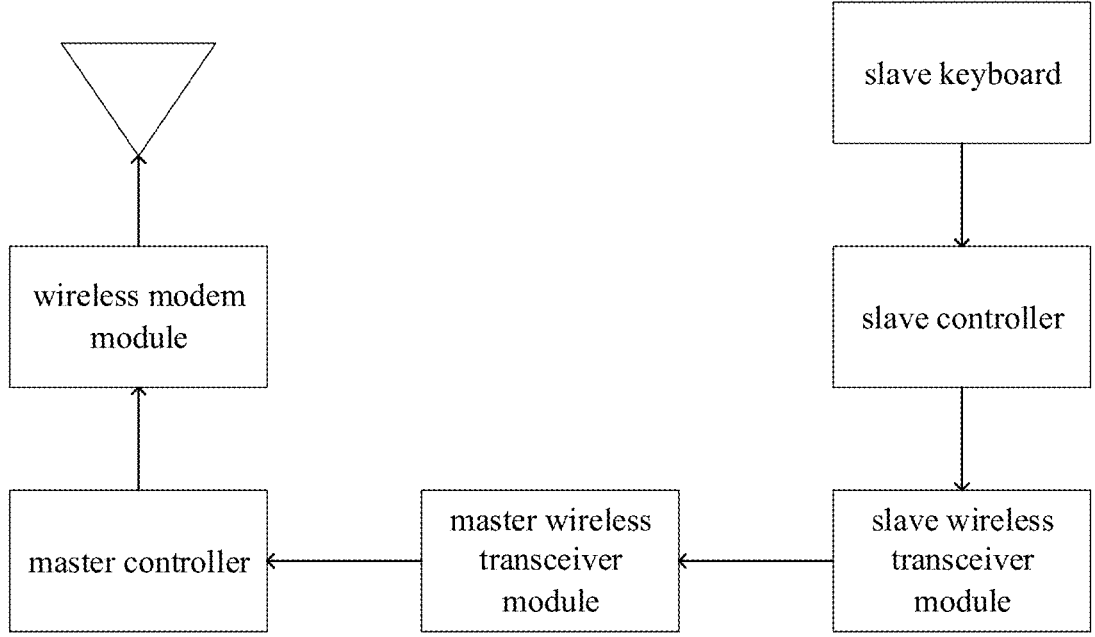
FIG. 7 is a block diagram illustrating the hardware structure of the mobile terminal shown in FIG. 6 in one working state.

As shown in FIG. 7, in a first working state of the mobile terminal 100, under the control of the slave controller, a control command output by the slave keyboard is sent to the master wireless transceiver module after being modulated by the slave wireless transceiver module. After the control command is received by the master wireless transceiver module, under the control of the master controller 13, the control command is sent to the air after being modulated by the wireless modem module.

Figure 8:
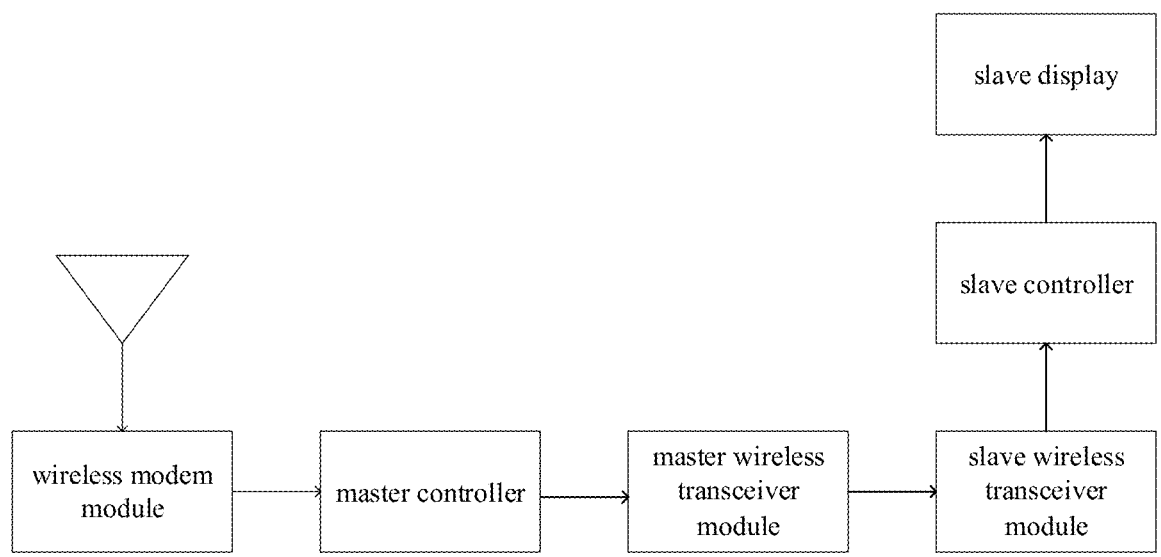
FIG. 8 is a block diagram illustrating the hardware structure of the mobile terminal shown in FIG. 6 in another working state.

As shown in FIG. 8, a control signal from the air is sent to the slave device 20, after passing through the master controller 13 and being modulated by the master wireless transceiver module. After being received by the slave wireless transceiver module, the control signal is displayed on a display screen 21 under the control of the slave controller.

Further, both the master wireless transceiver module and the slave wireless transceiver module are Bluetooth modules, or both of them are WIFI modules. It is understandable that Bluetooth is a kind of standards for the wireless technology that enables short-distance data exchange to be executed among a fixed apparatus, the mobile terminal 100, and a personal area network of a building. The band of Bluetooth is from 2400 MHz to 2483.5 MHz (including the guard band). This is a short-range radio frequency band of 2.4 GHz in the Industrial, Scientific and Medical (ISM) band that does not require a license (but is not unregulated) worldwide.

In a second implementation, as shown in FIG. 6, the master device 10 includes a wireless modem module and a master wireless transceiver module. The slave device 20 includes a slave controller, a slave microphone, a slave receiver, a slave wireless transceiver module, a slave audio encoder and a slave audio decoder, where the slave wireless transceiver module is capable of communicating with the master wireless transceiver module.

Figure 9:
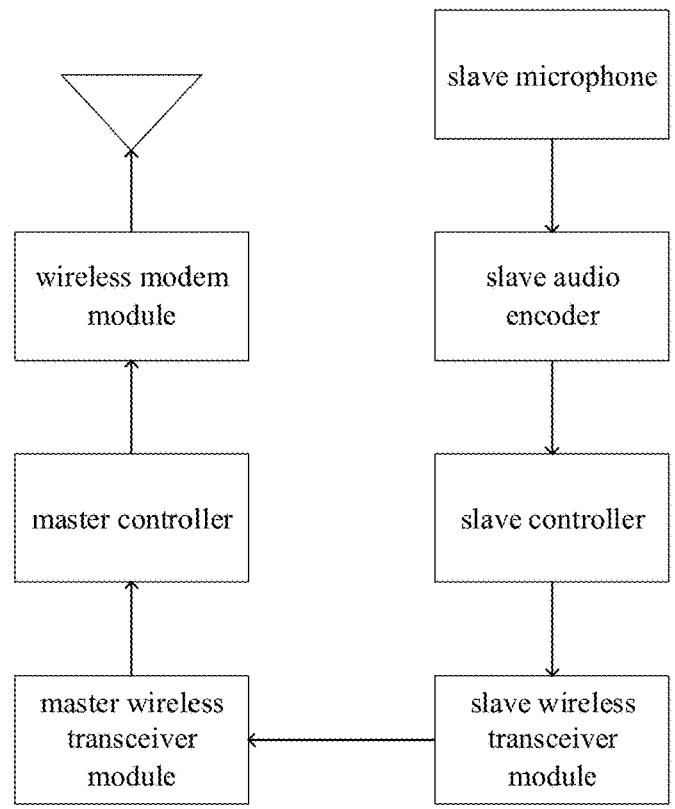
FIG. 9 is a block diagram illustrating the hardware structure of the mobile terminal shown in FIG. 6 in still another working state.

As shown in FIG. 9, in a working state, an audio signal from the slave microphone is transmitted to the slave controller after being encoded by the slave audio encoder. Under the control of the slave controller, the encoded audio signal is sent out by the slave wireless transceiver module. After being received by the master wireless transceiver module, the encoded audio signal is transmitted to the wireless modem module under the control of the master controller 13, and then is sent to the air after being modulated by the wireless modem module.

Figure 10:
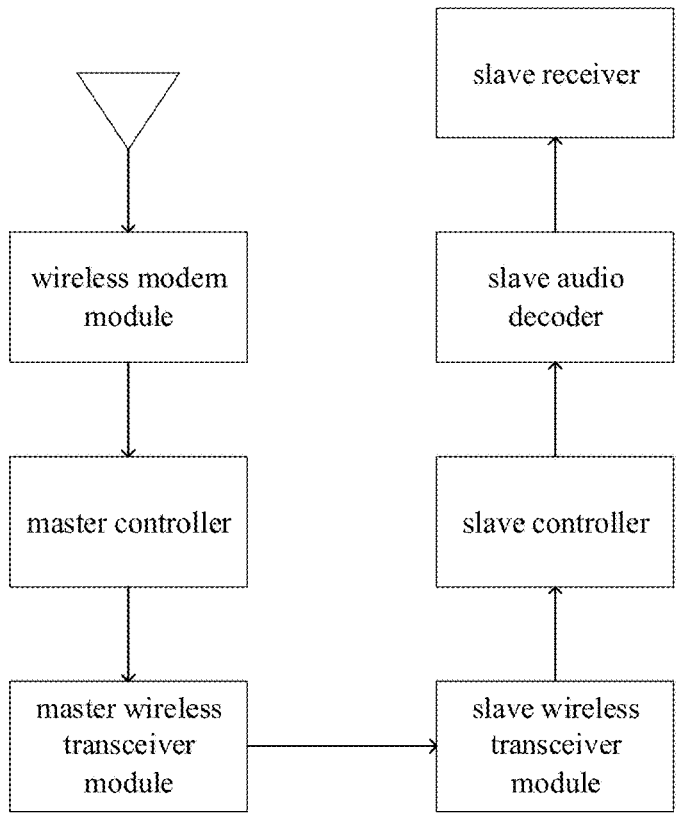
FIG. 10 is a block diagram illustrating the hardware structure of the mobile terminal shown in FIG. 6 in yet another working state.

As shown in FIG. 10, a signal from the air is transmitted to the master controller 13 after being demodulated by the wireless modem module. Under the control of the master controller 13, the demodulated signal is transmitted to the master wireless transceiver module, and it is then sent to the slave device 20 after being modulated by the master wireless transceiver module. The audio signal is demodulated by the slave wireless transceiver module, and under the control of the slave controller, the demodulated audio signal is decoded by the slave audio decoder for output by the slave receiver.

It is understandable that the slave audio encoder here may be a discrete hardware unit, or may be integrated into the microphone, or may be integrated into the slave controller; furthermore, in terms of the function, it may be an audio codec which also offers the function of audio decoding.

The slave audio decoder here may be a discrete hardware unit, or may be integrated into the receiver, or may be integrated into the slave controller; furthermore, in terms of the function, it may be an audio codec which also offers the function of audio encoding.

Figure 11:
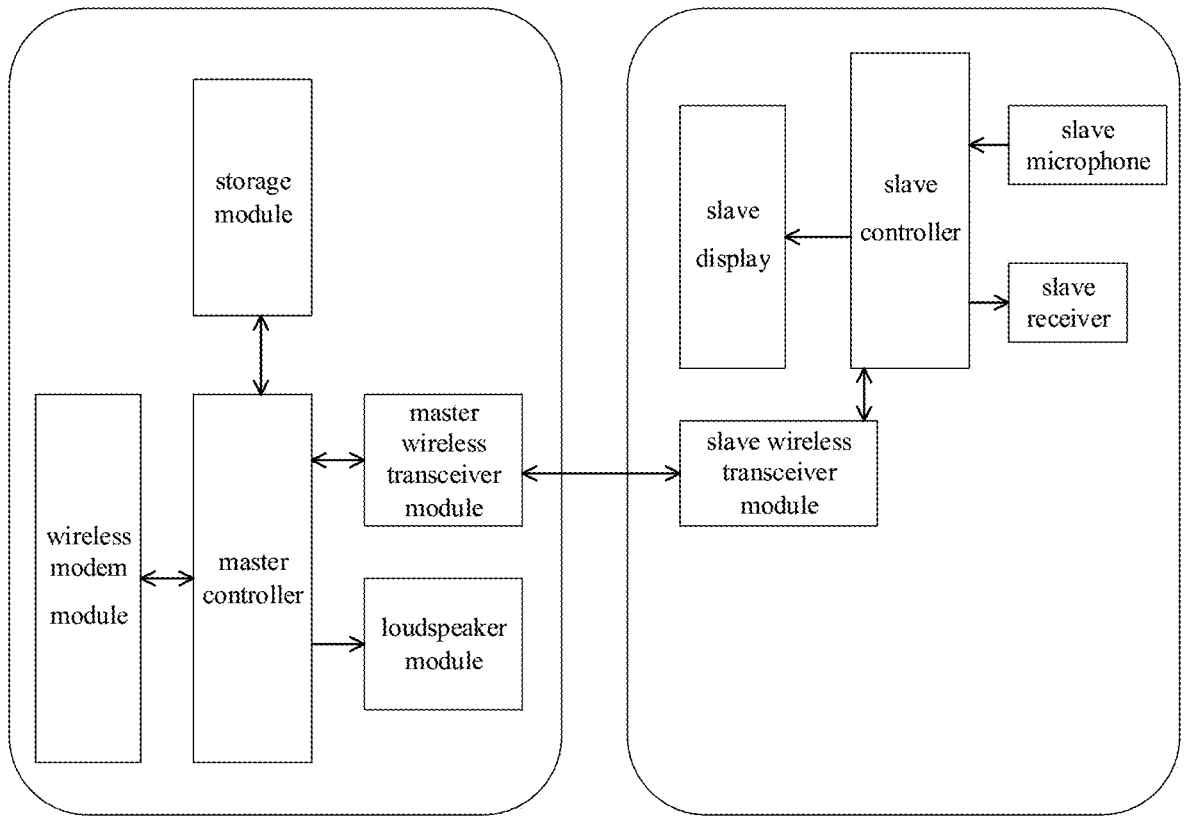
FIG. 11 is a block diagram illustrating the hardware structure of another implementation of the mobile terminal shown in FIG. 1.

In a third implementation, as shown in FIG. 11, the master device 10 includes a wireless modem module, a master controller 13, and a master wireless transceiver module. The slave device 20 includes a slave wireless transceiver module capable of communicating with the master wireless transceiver module. The slave device 20 can access a communication network through the master device 10.

Figure 12:
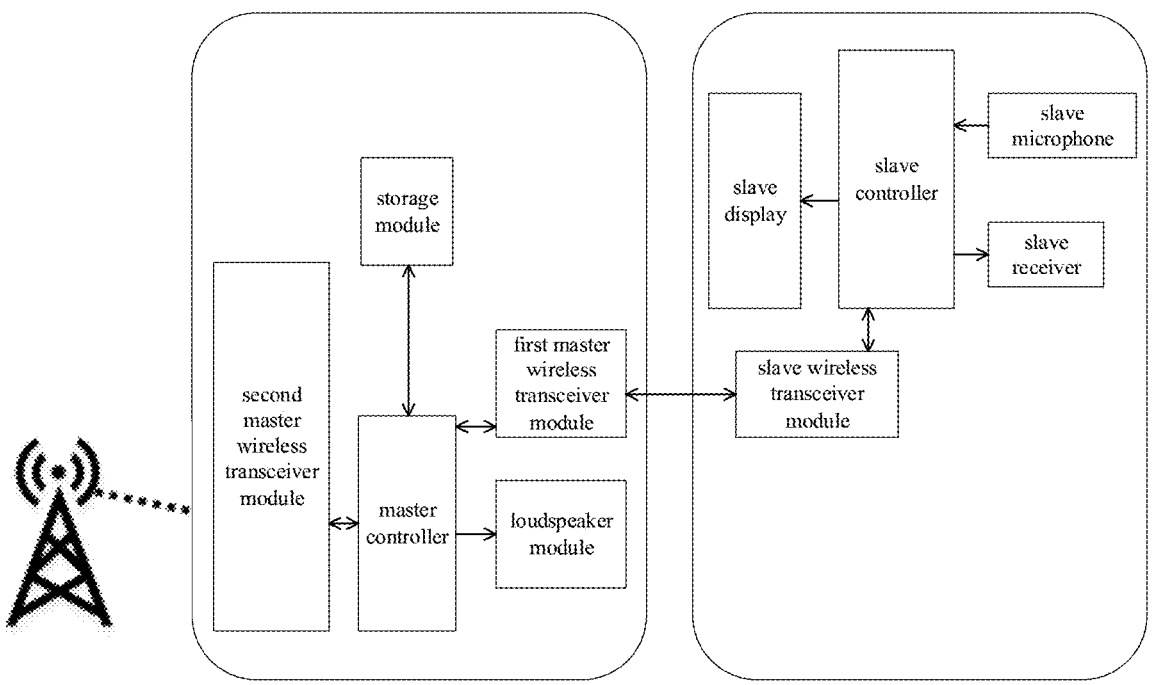
FIG. 12 is a block diagram illustrating the hardware structure of still another implementation of the mobile terminal shown in FIG. 1.

In a fourth implementation, as shown in FIG. 12, the master device 10 includes a first master wireless communication module, a master controller 13, and a second master wireless communication module. The slave device includes a slave wireless communication module. The slave wireless communication module is capable of communicating with the first master wireless communication module, and the second master wireless communication module is capable of communicating with a base station.

Figure 13:
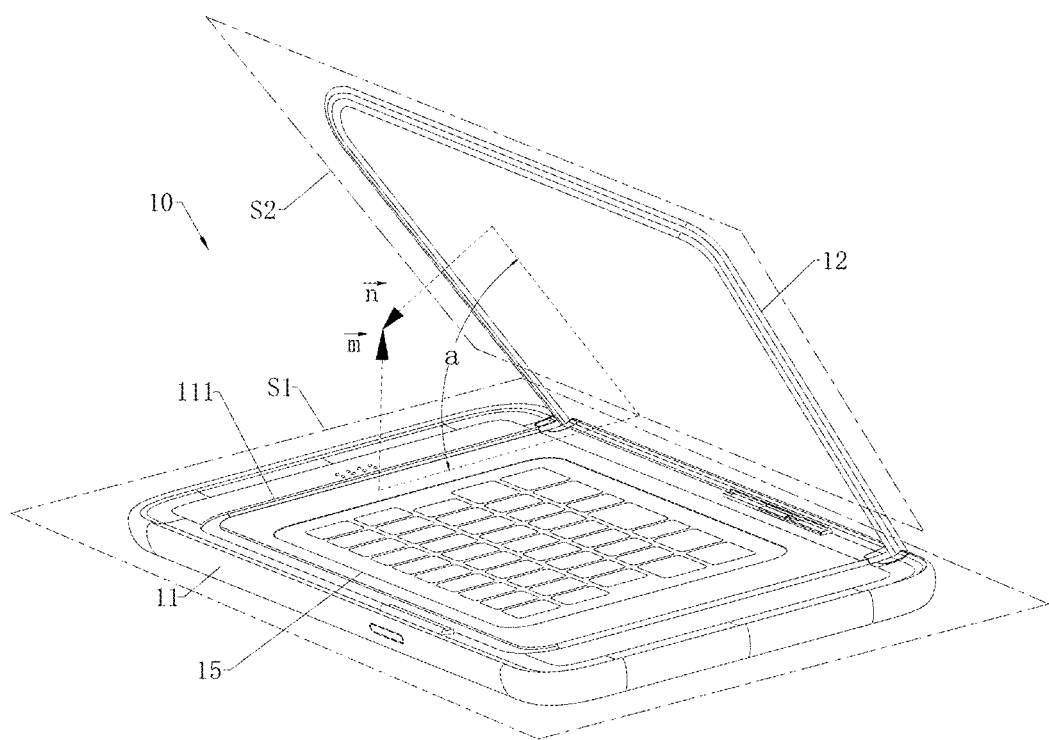
FIG. 13 is a schematic structural diagram illustrating the master device of the mobile terminal shown in FIG. 1, in which the master device is in still another usage state.

In the embodiments, referring to FIG. 13 in combination with FIG. 2, when the bracket 12 is rotated out of the groove 111 relative to the housing 11 and the angle of rotation α meets a second angle, the switch assembly 14 generates a second signal and sends the second signal to the master controller 13. The master controller 13 is configured to control, according to the second signal, the at least one component of the master device 10 to be switched to a second usage state. The second usage state is different from the first usage state. It can be understood that, in the case where the bracket 12 is rotated out of the groove 111 relative to the housing 11, at least one component of the master device 10 is switched to the first usage state when the angle of rotation α meets the first angle, and the at least one component of the master device 10 is switched to the second usage state when the angle of rotation α meets the second angle. In this way, when the user uses the mobile terminal 100, by taking different angles of rotation α by which the bracket 12 is rotated out of the groove 111 relative to the housing 11, the switch assembly 14 can be caused to generate different signals and send the generated signals to the master controller 13, and the master controller 13 can be caused to control, according to the different signals, the usage state of at least one component of the mobile terminal 100. Accordingly, the functions of the mobile terminal 100 can be more diversified, and a better user experience of the mobile terminal 100 is provided.

In some embodiments, the first usage state is an ON state, and the second usage state is an OFF state. It is understandable that, while the user uses the mobile terminal 100, when the bracket 12 is rotated out of the groove 111 relative to the housing 11 and the angle of rotation α meets the first angle, the master controller 13 controls at least one component of the master device 10 to be switched to the ON state, that is, the at least one component of the master device 10 starts to work, for example, a camera of the master device 10 is turned on; and when the angle of rotation α meets the second angle, the master controller 13 controls at least one component of the master device 10 to be switched to the OFF state, that is, the at least one component of the master device 10 stops working, for example, the camera is turned off. Therefore, in the embodiments, the user can flexibly control at least one component of the master device 10 to be the ON state or the OFF state, by making the angle of rotation α by which the bracket 12 is rotated out relative to the housing 11 meet the first angle or the second angle. Thus, the mobile terminal 100 is more convenient for the users to use. In particular, the user does not need to turn on or off some of the components of the master device 10 after rotating the bracket 12, thereby improving the user experience of the mobile terminal 100.

In some embodiments, referring to FIG. 3 and FIG. 13 again, the at least one component of the master device 10 includes a keyboard 15. The keyboard 15 is connected with the master controller 13 and arranged on the outside of the housing 11. It can be understood that, when the keyboard 15 is connected with the master controller 13, a signal can be transmitted between the master controller 13 and the keyboard 15. Once the master controller 13 receives the first signal, the master controller 13 controls the keyboard 15 to be powered on. Once the master controller 13 receives the second signal, the master controller 13 controls the keyboard 15 to be powered off. It can be understood that, the keyboard 15 may be a keyboard with physical keys, or a touch keyboard, i.e., a virtual keyboard. Optionally, in the case where the keyboard 15 is a keyboard with physical keys, when the master controller 13 controls the keyboard with physical keys to be powered on, each physical key of the keyboard with physical keys can be illuminated to prompt the user that the keyboard with physical keys has been activated. When the master controller 13 controls the keyboard with physical keys to be powered off, the light source of each physical key of the keyboard with physical keys is turned off to prompt the user that the keyboard with physical keys has been turned off. Of course, in other embodiments, the at least one component may also be a display screen. The display screen may be installed in an area enclosed by the groove 111. Once the master controller 13 receives the first signal, the master controller 13 controls the display screen to be powered on and display. Once the master controller 13 receives the second signal, the master controller 13 controls the display screen to be powered off.

In addition, in the case where the keyboard 15 is a touch keyboard, once the master controller 13 controls the keyboard 15 to be powered on, a virtual keyboard is displayed on an interface of the touch keyboard to prompt the user that the keyboard 15 has been activated. When the user touches a key on the virtual keyboard, a corresponding touch signal may be generated by the virtual keyboard. When the master controller 13 controls the touch keyboard to be powered off, the display interface of the touch keyboard is closed to prompt the user that the touch keyboard 15 is turned off.

Further, when the master controller 13 receives the first signal, the slave device 20 communicates with the master device 10 so that the slave device 20 can receive an input signal of the keyboard 15. It can be understood that the communication between the slave device 20 and the master device 10 may be wireless communication or wired communication. In addition, when the master controller 13 receives the first signal, the keyboard 15 is powered on. At this time, by means of the communication between the slave device 20 and the master device 10, the keyboard 15 of the master device 10 can be used as an input means of the slave device 20. That is, the user can operate on the keyboard 15 of the master device 10, and the input signal generated by the keyboard 15 can be sent to the slave device 20. Therefore, in the embodiments, by adopting the keyboard 15 of the master device 10 as the input means of the slave device 20, the user's hand does not block the display interface of the slave device 20 when the user inputs information to the slave device 20. This makes the mobile terminal 100 more convenient to use, and the user experience of the mobile terminal 100 is further improved.

Figure 14:
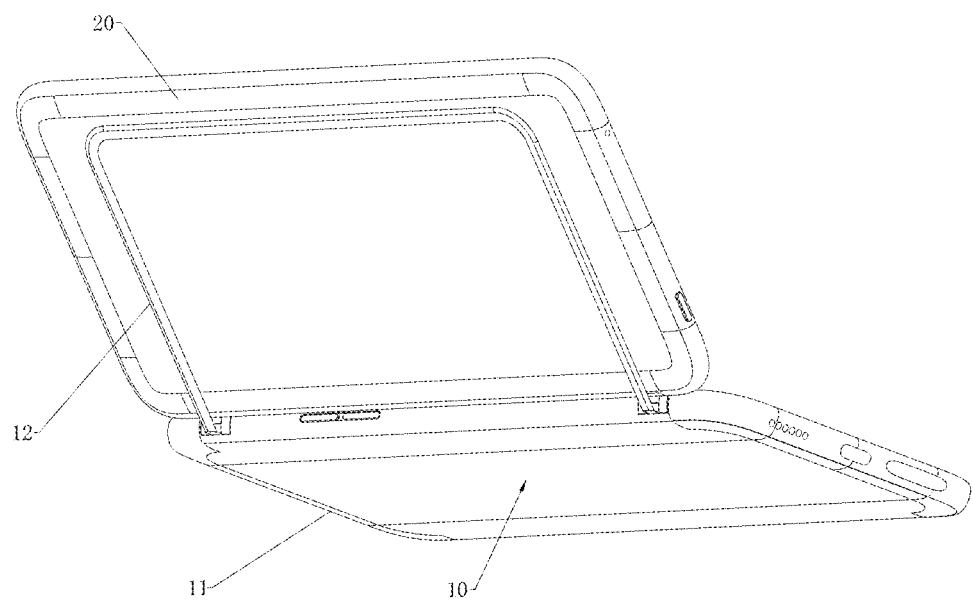
FIG. 14 is a schematic structural diagram illustrating the mobile terminal in another usage state according to the embodiments of the present disclosure.

Further, referring to FIG. 3 and FIG. 14, when the bracket 12 is rotated out of the groove 111 relative to the housing 11, and the angle of rotation α meets the first angle, the slave device 20 can be detachably installed on the bracket 12. That is, when the slave device 20 communicates with the master device 10, the slave device 20 can be detachably installed on the bracket 12. For example, the slave device 20 can be placed on and supported by the bracket 12, that is, the slave device 20 rests against the bracket 12. It is understandable that, when the slave device 20 is used in combination with and stands sidewards the master device 10 by means of the bracket (see FIG. 14), both hands of the user can be freed, which solves a problem of an inconvenient use that the user needs to keep the terminal stand with his/her hand(s) or an external tool at the time of for example watching videos. Furthermore, the user can directly operate on the keyboard 15 of the master device 10, to effectively control the display content of the slave device 20 through the communication between the slave device 20 and the master device 10. For example, the user can input game operation instructions on the keyboard 15 of the master device 10, and respective images can be displayed on the display screen of the slave device 20, thereby significantly improving the user experience of the mobile terminal 100.

In addition, when the slave device 20 is used in combination with and stands sidewards the master device 10, the master device 10 can stably support the slave device 20 through the bracket 12, so as to prevent the slave device 20 from slipping off the bracket 12 that would otherwise happen with an unstable supporting structure, thereby reducing the risk of damaging the mobile terminal 100.

In the embodiments, referring to FIG. 3 and FIG. 13 again, the keyboard 15 is located in the area enclosed by the groove 111. It can be understood that, by arranging the keyboard 15 in the area enclosed by the groove 111, the bracket 12 does not interfere with the keyboard 15 when the bracket 12 is rotated out of the groove 111 relative to the housing 11; meanwhile, the keyboard 15 can also be arranged, at its largest area, on the housing 11, which enables the user to have an enough operation space for operating the keyboard 15, ensuring the better user experience of the mobile terminal 100. Of course, in other embodiments, the keyboard 15 may also be composed of multiple parts that are separately provided and can communicate with each other. In this case, the multiple parts are sequentially arranged around the groove 111 in such a manner that the bracket 12 does not interfere with the keyboard 15 when the bracket 12 is rotated out of the groove 111 relative to the housing 11.

In some embodiments, the master device 10 includes a wireless communication module, such as a Bluetooth module or a WIFI communication module. Upon receiving the first signal, the master controller 13 controls the Bluetooth module or the wireless communication module to be turned on. It is understandable that, when the Bluetooth module or the wireless communication module is turned on, the slave device 20 can communicate with the master device 10 to realize data transmission therebetween. Upon receiving the second signal, the master controller 13 controls the Bluetooth module or the wireless communication module to be turned off, so as to avoid waste of traffic of the master device 10.

In the embodiments, the switch assembly 14 can be implemented in multiple ways.

In a first implementation, as shown in FIG. 3 and FIG. 5, the housing 11 has a light-transmitting part 112, and the light-transmitting part 112 is located in the groove 111. The switch assembly 14 includes a photoelectric sensor 141. The photoelectric sensor 141 faces the light-transmitting part 112 directly. When the bracket 12 is rotated out of the groove 111 relative to the housing 11, and the photoelectric sensor 141 can receive external light passing through the light-transmitting part 112, the angle of rotation α of the bracket 12 is determined as the first angle. It can be understood that, the external light refers to the sunlight or light emitted by a light source. When the bracket 12 is rotated into the groove 111 relative to the housing 11, since the light-transmitting part 112 is located in the groove 111, the bracket 12 completely covers the light-transmitting part 112. At this time, the photoelectric sensor 141 cannot receive the external light through the light-transmitting part 112. When the bracket 12 is rotated out of the groove 111 relative to the housing 11 and the light-transmitting part 112 is exposed relative to the bracket 12, i.e., the bracket 12 no longer covers the light-transmitting part 112, the external light propagates to the photoelectric sensor 141 through the light-transmitting part 112. The photoelectric sensor 141 collects the external light. At this time, the photoelectric sensor 141 generates the first signal, and sends the first signal to the master controller 13. The master controller 13 controls, according to the first signal, at least one component to be switched to the first usage state. Therefore, in the embodiments, by providing the photoelectric sensor 141 of the switch assembly 14 in the housing 11, the photoelectric sensor 141 receives the external light in response to the angle of rotation α by which the bracket 12 is rotated out relative to the housing 11 meeting the first angle, so that the master controller 13 can control, according to the signal generated by the photoelectric sensor, at least one component to be switched to the first usage state, thereby improving the user experience of the mobile terminal 100.

Furthermore, for making response to the angle of rotation α by which the bracket is rotated out relative to the housing 11, different from the way that some complicated position-limiting structures are adopted to limit the bracket 12 at different angles of rotation and then the angle of rotation α is measured by an angle sensor, the photoelectric sensor 141 is directly disposed in the housing 11 in the embodiments, which enables the structure of the master device 10 to be simplified, thereby improving the utilization rate of the internal space of the master device 10.

Further, referring to FIG. 5 and FIG. 13 again, when the bracket 12 is rotated out of the groove 111 relative to the housing 11 and the light-transmitting part 112 is blocked by the bracket 12, the angle of rotation α of the bracket 12 is determined as the second angle. It is understandable that, when the bracket 12 is located in the groove 111, the photoelectric sensor 141 cannot collect the external light through the light-transmitting part 112. In addition, when the bracket 12 is rotated out of the groove 111 relative to the housing 11 and the angle of rotation α by which the bracket 12 is rotated out relative to the housing 11 reaches the first angle, the photoelectric sensor 141 can collect the external light passing through the light-transmitting part 112. Accordingly, since the bracket 12 starts to be rotated out relative to the housing 11 until the angle of rotation by which the bracket 12 is rotated out relative to the housing 11 reaches the first angle, the bracket 12 always blocks the light-transmitting part 112, that is, the photoelectric sensor 141 cannot collect the external light passing through the light-transmitting part 112. At this time, the angle of rotation α of the bracket 12 is determined as the second angle, which is between an angle defined at the time when the bracket 12 starts to be rotated out relative to the housing 11 and the first angle by which the bracket 12 is rotated out relative to the housing 11. That is, the second angle is smaller than the first angle. In the embodiments, when the bracket 12 is rotated out of the groove 111 relative to the housing 11, and the angle of rotation α meets the second angle, the photoelectric sensor 141 cannot collect the external light. At this time, the photoelectric sensor 141 sends the second signal to the master controller 13, so that the master controller 13 controls at least one component to be switched to the second usage state.

Furthermore, as shown in FIG. 5, the groove 111 is provided with a light-transmitting through hole 1111 to define the light-transmitting part 112. It can be understood that, the light-transmitting through hole 1111 enables the outside of the housing 11 to be communicated with the inside of the housing 11, that is, the external light can propagate from the outside of the housing 11 to the inside of the housing 11 through the light-transmitting through hole 1111. The housing 11 is provided with a light-transmitting member 1112, and the light-transmitting member 1112 covers the light-transmitting through hole 1111. It can be understood that, the light-transmitting member 1112 can be, but is not limited to, a flat mirror. In this case, with reference to FIG. 3, when the bracket 12 is rotated out of the groove 111 relative to the housing 11, and the angle of rotation α meets the first angle, the external light propagates the inside of the housing 11 through the light-transmitting member 1112, and is received by the photoelectric sensor 141. In addition, by providing the light-transmitting member 1112 in the light-transmitting hole 1111, the sealing performance of the master device 10 can be improved, that is, it enables the external moisture or dust to be prevented from entering into the housing 11 through the light-transmitting hole 1111. Further, the light-transmitting member 1112 includes a connecting portion 1113 and a body portion 1114. The connecting portion 1113 is provided at the periphery of the body portion 1114, and the body portion 1114 extends with respect to the connecting portion 1113 towards the first surface 115 so that a step is formed. One side of the connecting portion 1113 is connected to the inner wall of the housing 11. The body portion 1114 is at least partially embedded in the light-transmitting through hole 1111. Optionally, the connecting portion 1113 is glued to the inner wall of the housing 11, which not only ensures the stable fixing of the light-transmitting member 1112 on the housing 11, but also can further improve the sealing performance of the master device 10, that is, it enables the external moisture or dust to be avoided from entering the inside of the housing 11 through the light-transmitting through hole 1111. In addition, a compressible foam may also be bonded between the connecting portion 1113 and the inner wall of the housing 11.

In the embodiments, referring to FIG. 5, the photoelectric sensor 141 includes a transmitting portion 1411 and a receiving portion 1412 spaced apart from each other. The transmitting portion 1411 is configured to emit, in a first light environment, light to propagate towards the outside of the housing 11 through the light-transmitting part 112. It can be understood that, the master device 10 includes an ambient light sensor. The ambient light sensor can sense the brightness of the environment. When it is detected by the ambient light sensor that the brightness of the environment is lower than a preset brightness, the ambient light sensor sends the collected signal to the master controller 13, and the master controller 13 accordingly determines the current external environment as the first light environment. For example, the first light environment may be a no-light environment or a dark environment. When the external environment is not the first light environment, the receiving portion 1412 can be used to receive the external light.

As shown in FIG. 5 and FIG. 13, in the case where the bracket 12 is rotated out of the groove 111 relative to the housing 11, when the angle of rotation α meets the second angle and the transmitting portion 1411 can emit light, the receiving portion 1412 is configured to receive light that is emitted by the transmitting portion 1411 and reflected back by the bracket 12, and generate the second signal therefrom. It can be understood that, when the external environment is the first light environment and the user rotates the bracket 12 out of the groove 111 relative to the housing 11, the master controller 13 controls the transmitting portion 1411 to emit light towards the outside of the housing 11. When the light emitted by the transmitting portion 1411 is reflected by the bracket 12 back into the housing 11, the receiving portion 1412 receives the reflected light and generates the second signal. The receiving portion 1412 sends the second signal to the master controller 13. The master controller 13 controls, according to the second signal, at least one component to be switched to the second usage state.

Further, as shown in FIG. 3 and FIG. 5, in the case where the bracket 12 is rotated out of the groove 111 relative to the housing 11, when the angle of rotation α meets the first angle and the transmitting portion 1411 can emit light, the receiving portion 1412 is further configured to generate the first signal. Specifically, when the external environment is the first light environment and the user rotates the bracket 12 out of the groove 111 relative to the housing 11, the master controller 13 controls the transmitting portion 1411 to emit light towards the outside of the housing 11. In this case, when the light emitted by the transmitting portion 1411 is no longer reflected by the bracket 12, the receiving portion 1412 cannot receive the light emitted by the transmitting portion 1411. At this time, the receiving portion 1412 sends the first signal to the master controller 13. The master controller 13 receives the first signal, and controls, according to the first signal, at least one component to be switched to the first usage state.

Furthermore, the master device 10 includes an anti-light-interference component 1413. The anti-light-interference component 1413 is located between the transmitting portion 1411 and the receiving portion 1412. It can be understood that, in the first light environment, the transmitting portion 1411 emits light towards the outside of the housing 11. At this time, the receiving portion 1412 sends the first signal or the second signal to the master controller 13, depending on whether the receiving portion 1412 can receive the light reflected by the bracket 12. In this case, by disposing the anti-light-interference component 1413 between the transmitting portion 1411 and the receiving portion 1412, the light emitted by the transmitting portion 1411 towards the outside of the housing 11 is avoided from being reflected by the housing 11 to the receiving portion 1412 and received by the receiving portion 1412, so as to prevent an erroneous signal from being sent by the receiving portion 1412 to the master controller 13.

Furthermore, as shown in FIG. 5, the master device 10 includes a circuit board 16 and a second sealing member 17. The master controller 13 and the photoelectric sensor 141 are arranged on the circuit board 16. The material of the second sealing member 17 may be, but is not limited to, silicone or Thermoplastic Polyurethanes (TPU). The second sealing member 17 is arranged around the periphery of the photoelectric sensor 141 to separate the photoelectric sensor 141 from the master controller 13. One end face of the second sealing member 17 is connected to the inner wall of the housing 11 (or to the light-transmitting member 1112, if any), and the other end face of the second sealing member is connected to the circuit board 16. In this case, the second sealing member 17 can not only stably fix the photoelectric sensor 141 on the circuit board 16, but also prevent the external moisture or dust from entering the photoelectric sensor 141.

Figure 15:
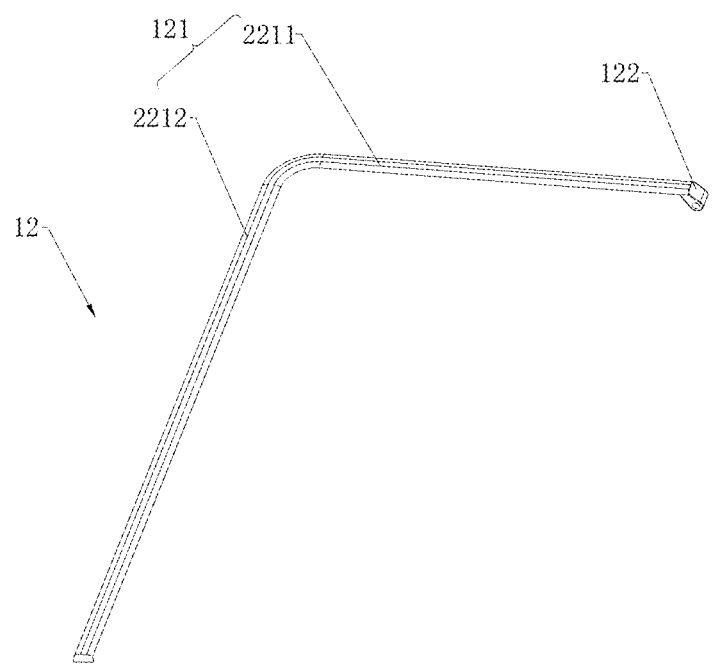
FIG. 15 is a schematic structural diagram illustrating an implementation of a bracket of the master device shown in FIG. 3.

In the embodiments, as shown in FIG. 15, the bracket 12 includes a supporting portion 121 and a first rotating portion 122. One end of the first rotating portion 122 is connected to an end of the supporting portion 121. With reference to FIG. 3, the other end of the first rotating portion 122 is rotatably connected to a groove wall at one end of the groove 111, so that the supporting portion 121 can be rotated into or out of the groove 111. It can be understood that the supporting portion 121 may be in a rod-shaped structure or a plate-shaped structure. Specifically, in the case where the bracket 12 is in a rod-shaped structure, the supporting portion 121 includes a first arm 2211 and a second arm 2212. The first arm 2211 and the second arm 2212 define an included angle therebetween. Optionally, the first arm 2211 and the second arm 2212 are substantially perpendicular to each other. The first rotating portion 122 is connected to an end of the first arm 2211. Optionally, the first rotating portion 122 may be rotatably connected to the groove wall at the end of the groove 111 through a rotating shaft.

Figure 16:
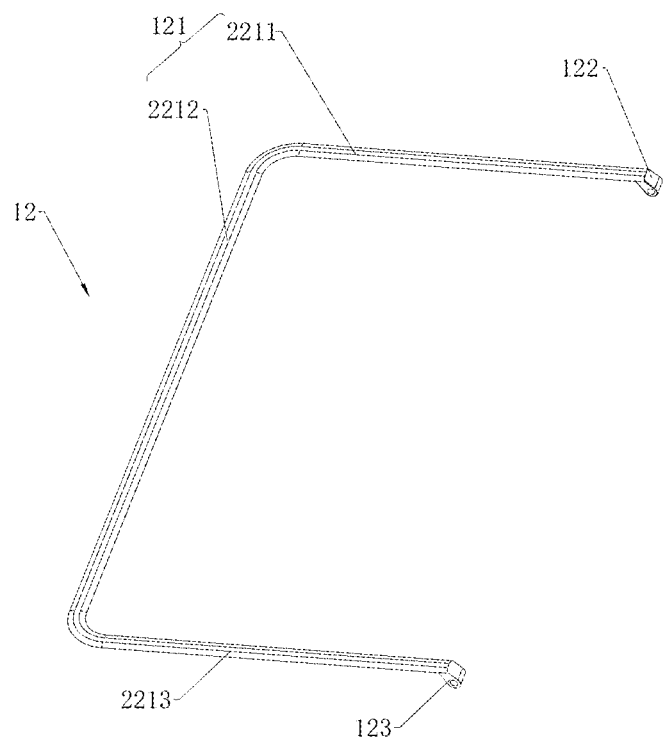
FIG. 16 is a schematic structural diagram illustrating another implementation of the bracket of the master device shown in FIG. 3.

Further, as shown in FIG. 16, the supporting portion 121 may further include a third arm 2213 and the bracket 12 further includes a second rotating portion 123. The third arm 2213 is arranged opposite to the first arm 2211 and one end of the third arm 2213 is connected to an end of the second arm 2212 away from the first arm 2211. One end of the second rotating portion 123 is connected with the other end of the third arm 2213 away from the second arm 2212. The other end of the second rotating portion 123 is rotatably connected to the groove wall at the other end of the groove 111. Optionally, the second rotating portion 123 may be rotatably connected to the groove wall at the other end of the groove 111 through a rotating shaft. In this case, by providing the second rotating portion 123 on the bracket 12 and making the second rotating portion 123 rotatably connected to the groove wall at the other end of the groove 111, it is further ensured that the slave device 20 does not slide out of the bracket 12 when the slave device 20 is detachably leaning on the bracket 12, thereby reducing the risk of damaging the mobile terminal 100. In addition, in the case where the bracket 12 is in a plate-shaped structure, for example, a flat plate may be at least disposed in a space enclosed by the first arm 2211, the second arm 2212 and the third arm 2213, and the thickness of the flat plate may be equal to or smaller than those of the three arms.

Furthermore, as shown in FIG. 2 and FIG. 5, the master device 10 includes a bracket base 18. The bracket base 18 may be made of stainless steel. The bracket base 18 is fixed at the end of the groove 111. Optionally, the bracket base 18 may be fastened onto the housing 11 by a fastener 181, such as a screw or a bolt. The first rotating portion 122 is rotatably connected to the bracket base 18. The first rotating portion 122 includes an arc-shaped sliding surface 1221 and a planar position-limiting surface 1222. The position-limiting surface 1222 is connected to one end of the sliding surface 1221. The sliding surface 1221 is configured to slide with respect to a planar outer surface of the bracket base 18 when the bracket 12 is rotated out of the groove 111. The position-limiting surface 1222 is configured to abut against the planar outer surface of the bracket base 18 after the bracket 12 is rotated out of the groove 111 to some extent, for example when the rotation of angle of the bracket 12 reaches a preset angle threshold, the preset angle threshold may be equal to or larger than the first angle. It can be understood that, when the position-limiting surface 1222 abuts against the bracket base 18, the bracket 12 stops rotating, so as to prevent excessive rotation of the bracket 12 relative to the housing 11, and thus prevent the slave device detachably mounted on the bracket from slipping off. In addition, by providing the bracket base 18 on the housing 11, the strength of the housing 11 can be increased, and the reliability of the housing 11 can be ensured. The second rotating portion 123 has a similar shape and structure to those of the first rotating portion 122, and thus cooperates with the bracket base 18 in a similar manner to the first rotating portion 122.

Further, the sliding surface 1221 is provided thereon with a lubricating layer. Specifically, in the case where the sliding surface 1221 is provided with the lubricating layer, the lubricating layer can be formed by coating a lubricant on the sliding surface 1221, but it is not limited thereto. The lubricant may be silicone oil, polytetrafluoroethylene, graphite, molybdenum disulfide, boron nitride or the like. In this case, when the sliding surface 1221 slides on the bracket base 18, the friction force between the sliding surface 1221 and the surface of the bracket base 18 is relatively small, and accordingly, the wear of the bracket 12 and the bracket base 18 is minimized. In addition, a rough structure may be additionally provided for the position-limiting surface 1222 to increase the roughness thereof, so as to improve the reliability of the bracket 12.

Further, referring to FIG. 2 again, a receiving recess 113 is provided at a part of the outer surface of the housing 11. The groove 111 is located within the receiving recess 113. Referring to FIG. 1 again, when the bracket 12 is rotated into the groove 111 relative to the housing 11, the slave device 20 is detachably installed in the receiving recess 113, and the slave device 20 blocks the bracket 12. It can be understood that, the receiving recess 113 is provided on the first surface 115. It can be understood that, the shape of the receiving recess 113 is substantially the same as the shape of the slave device 20. When the slave device 20 is detachably installed in the receiving recess 113, the slave device 20 can be partially or completely received in the receiving recess 113. In this case, the total thickness of the master device 10 and the slave device 20 in the stacked state is significantly reduced.

Figure 17:
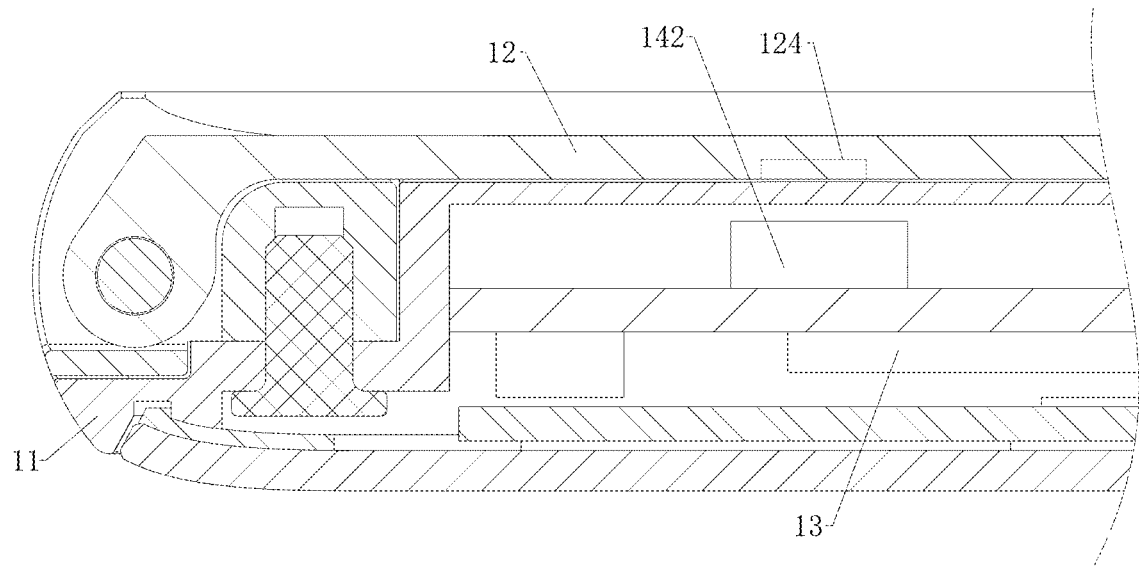
FIG. 17 is a partial cross-sectional view schematically illustrating another implementation of the master device shown in FIG. 2, which is taken along line A-A.

In a second implementation, most of the technical contents that are the same as in the first implementation will not be repeated here. As shown in FIG. 17, the switch assembly 14 includes a Hall sensor 142, and the bracket 12 has a magnetic part 124. It can be understood that, the magnetic part 124 may be, but is not limited to, a magnet or a magnetic colloid. In combination with FIG. 3, when the bracket 12 is rotated out of the groove 111, and a Hall voltage induced by a Hall effect is out of a preset Hall voltage range, the angle of rotation $\alpha$ of the bracket 12 is determined as the first angle, the Hall effect being produced by the magnetic part 124 and the Hall sensor 142. Referring to FIG. 13, when the bracket 12 is rotated out of the groove 111, and the Hall voltage induced by the Hall effect between the magnetic part 124 and the Hall sensor 142 is within the preset Hall voltage range, the angle of rotation $\alpha$ of the bracket 12 is determined as the second angle.

Specifically, when the bracket 12 is rotated into the groove 111 relative to the housing 11, since the magnetic part 124 is located in the groove 111, the distance between the magnetic part 124 and the Hall sensor 142 is the shortest. At this time, the Hall effect can be produced by the magnetic part 124 and the Hall sensor 142, and the induced Hall voltage is the largest. In the case where the bracket 12 is rotated out of the groove 111 relative to the housing 11, as the magnetic part 124 gradually moves away from the Hall sensor 142, the Hall voltage, that is induced due to the Hall effect produced by the magnetic part 124 and the Hall sensor 142, becomes smaller and smaller. When the Hall voltage is still within the preset Hall voltage range, the Hall sensor 142 generates the second signal and sends the second signal to the master controller 13. The master controller 13 controls, according to the second signal, at least one component to be switched to the second usage state. When the magnetic part 124 is moved further from the Hall sensor 142, the Hall voltage, that is induced due to the Hall effect produced by the magnetic part 124 and the Hall sensor 142, is out of the preset Hall voltage range, the Hall sensor 142 generates the first signal and sends the first signal to the master controller 13. The master controller 13 controls, according to the first signal, at least one component to be switched to the first usage state.

In the embodiments, the Hall sensor 142 of the switch assembly 14 is provided on the housing 11, in such a manner that the angle of rotation $\alpha$ by which the bracket 12 is rotated out relative to the housing 11 may be determined as the first angle or the second angle according to the Hall effect produced by the Hall sensor 142 and the magnetic part 124. Accordingly, the master controller 13 can control, according to the signal generated by the Hall sensor, at least one component to be switched to the first usage state or the second usage state, so as to improve the user experience of the mobile terminal 100.

Figure 18:
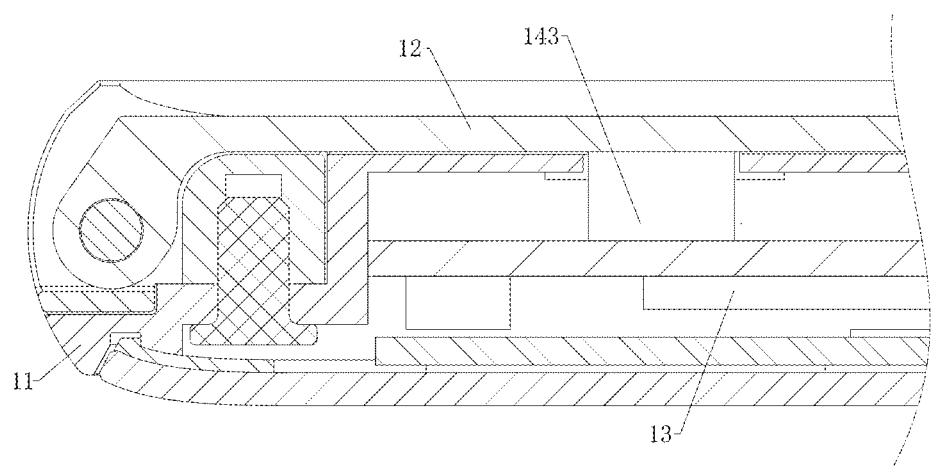
FIG. 18 is a partial cross-sectional view schematically illustrating still another implementation of the master device shown in FIG. 2, which is taken along line A-A.

In a third implementation, most of the technical contents that are the same as in the first and second implementations will not be repeated here. As shown in FIG. 18, the switch assembly 14 includes a key switch 143. In combination with FIG. 3, when the bracket 12 is rotated out of the groove 111 and the pressure applied by the bracket 12 to the key switch 143 is less than or equal to a preset pressure, the angle of rotation α of the bracket 12 is determined as the first angle. In combination with FIG. 13, when the bracket 12 is rotated out of the groove 111 relative to the housing 11 and the pressure applied by the bracket 12 to the key switch 143 is greater than the preset pressure, the angle of rotation α of the bracket 12 is determined as the second angle.

Specifically, when the bracket 12 is rotated into the groove 111 relative to the housing 11, since the bracket 12 is located in the groove 111, the bracket 12 completely abuts against the key switch 143, and thus, the pressure applied by the bracket 12 to the key switch 143 is the largest. In addition, optionally, when the bracket 12 is located in the groove 111, the bracket 12 can be confined in the groove 111 by means of a magnetic member or a fastener, to prevent the key switch 143 from pushing the bracket 12 out of the groove 111. In the case where the bracket 12 is rotated out of the groove 111 relative to the housing 11, as the bracket 12 gradually moves away from the key switch 143, the pressure applied to the key switch 143 becomes smaller and smaller. When the pressure applied to the key switch 143 is still greater than the preset pressure, the key switch 143 generates the second signal and sends the second signal to the master controller 13. The master controller 13 controls, according to the second signal, at least one component to be switched to the second usage state. When the bracket 12 is completely separated from the key switch 143 or the pressure applied by the bracket 12 to the key switch 143 is less than the preset pressure, the key switch 143 generates the first signal and sends the first signal to the master controller 13. The master controller 13 controls, according to the first signal, at least one component to be switched to the first usage state.

In the embodiments, the key switch 143 of the switch assembly 14 is provided on the housing 11, in such a manner that the angle of rotation α by which the bracket 12 is rotated out relative to the housing 11 may be determined as the first angle or the second angle according to the pressure applied to the key switch 143. Accordingly, the master controller 13 can control, according to the signal generated by the key switch, at least one component to be switched to the first usage state or the second usage state, so as to improve the user experience of the mobile terminal 100.

Figure 19:
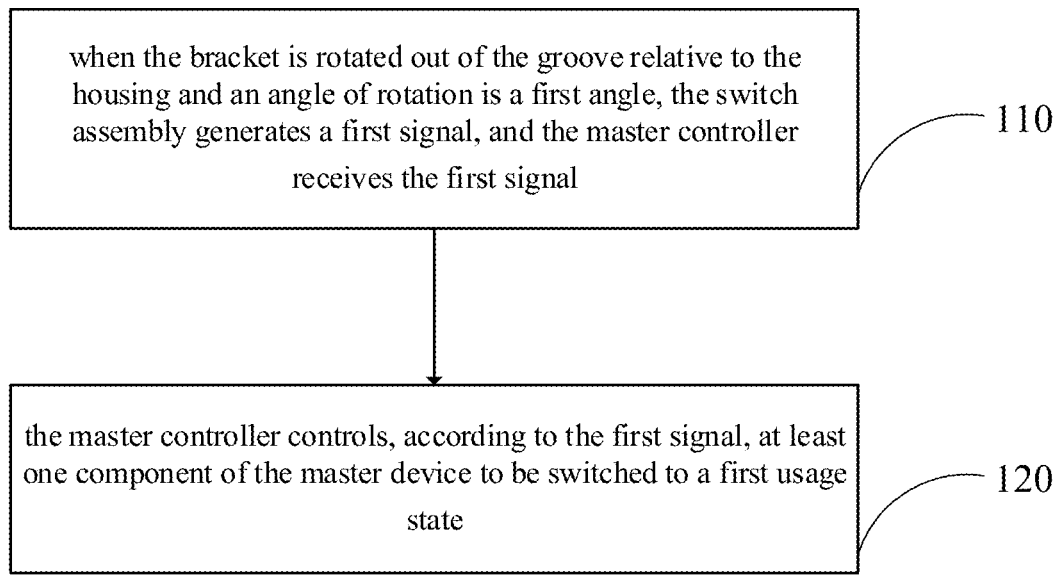
FIG. 19 is a schematic flowchart of a method for controlling a mobile terminal according to the embodiments of the present disclosure.

Referring to FIG. 19, a method for controlling a mobile terminal is provided by the embodiments of the disclosure. Referring to FIG. 1 to FIG. 4 again, the mobile terminal 100 includes a master device 10 and a slave device 20. The slave device 20 is detachably installed on the master device 10. Referring to FIG. 2, FIG. 3 and FIG. 5, the master device 10 includes a housing 11, a bracket 12, a master controller 13 and a switch assembly 14. The housing 11 is provided with a groove 111 configured to receive the bracket. The bracket 12 is capable of being rotated into or out of the groove 111 relative to the housing 11. The master controller 13 is provided inside the housing 11. The switch assembly 14 is connected with the master controller 13. The switch assembly 14 is arranged in the housing 11 and faces directly the groove 111.

The method includes operations as follows.

At block 110, when the bracket 12 is rotated out of the groove 111 relative to the housing 11 and an angle of rotation α meets a first angle, the switch assembly 14 generates a first signal, and the master controller 13 receives the first signal. The angle of rotation α can be defined with reference to the above-mentioned embodiments, which will not be repeated here.

Optionally, referring to FIG. 3 and FIG. 5 again, the housing 11 has a light-transmitting part 112, and the light-transmitting part 112 is located in the groove 111. The switch assembly 14 includes a photoelectric sensor 141. The photoelectric sensor 141 faces directly the light-transmitting part 112. When the bracket 12 is rotated out of the groove 111 relative to the housing 11, and the photoelectric sensor 141 can receive external light passing through the light-transmitting part 112, the angle of rotation a of the bracket 12 is determined as the first angle. It can be understood that, the external light refers to the sunlight or light emitted by a light source. When the bracket 12 is rotated into the groove 111 relative to the housing 11, since the light-transmitting part 112 is located in the groove 111, the bracket 12 completely covers the light-transmitting part 112. At this time, the photoelectric sensor 141 cannot receive the external light through the light-transmitting part 112. When the bracket 12 is rotated out of the groove 111 relative to the housing 11 and the light-transmitting part 112 is exposed relative to the bracket 12, i.e., the bracket 12 no longer covers the light-transmitting part 112, the external light propagates to the photoelectric sensor 141 through the light-transmitting part 112. The photoelectric sensor 141 collects the external light. At this time, the photoelectric sensor 141 generates the first signal, and sends the first signal to the master controller 13. Of course, in other embodiments, the switch assembly 14 can also be a Hall sensor 142 or a key switch 143, and the specific arrangements can refer to the above-mentioned implementations of the switch assembly, which will not be repeated here.

At block 120, the master controller 13 controls, according to the first signal, at least one component of the master device to be switched to a first usage state.

Optionally, the master controller 13 has a database. When the master controller 13 acquires the first signal, the master controller 13 processes the first signal to obtain a data signal, and searches the database for a match between the data signal and the data stored in the database. Upon successfully searching out the data matching the data signal, the master controller 13 sends an electrical signal to at least one component of the master device 10, to make the at least one component be switched to the first usage state. The first usage state may be a state in which the at least one component is turned on.

Further, the method includes operations as follows.

When the bracket 12 is rotated out of the groove 111 relative to the housing 11 and the angle of rotation α meets a second angle, the switch assembly 14 generates a second signal and the master controller 13 receives the second signal.

Optionally, referring to FIG. 5 and FIG. 13 again, when the bracket 12 is located in the groove 111, the photoelectric sensor 141 cannot collect the external light passing through the light-transmitting part 112. In addition, when the bracket 12 is rotated out of the groove 111 relative to the housing 11 and the angle of rotation α by which the bracket 12 is rotated out relative to the housing 11 reaches the first angle, the photoelectric sensor 141 can collect the external light passing through the light-transmitting part 112. Accordingly, since the bracket 12 starts to be rotated out relative to the housing 11 until the angle of rotation by which the bracket 12 is rotated out relative to the housing 11 reaches the first angle, the bracket 12 always blocks the light-transmitting part 112, that is, the photoelectric sensor 141 cannot collect the external light through the light-transmitting part 112. At this time, the angle of rotation α of the bracket 12 is determined as the second angle, which is between an angle defined at the time when the bracket 12 starts to be rotated out relative to the housing 11 and the first angle by which the bracket 12 is rotated out relative to the housing 11. In the embodiments, when the bracket 12 is rotated out of the groove 111 relative to the housing 11, and the angle of rotation α meets the second angle, the photoelectric sensor 141 cannot collect the external light. At this time, the photoelectric sensor 141 sends the second signal to the master controller 13.

The master controller 13 controls, according to the second signal, at least one component of the master device 10 to be switched to the second usage state, where the second usage state is different from the first usage state.

The second usage state may be a state in which the at least one component is turned off.

Further, the method includes operations as follows. The master device 10 includes a wireless communication module, such as a Bluetooth module or a WIFI communication module.

In the first usage state, the Bluetooth module or the wireless communication module is turned on. At this time, the slave device 20 can communicate with the master device 10 to realize data transmission therebetween. In the second usage state, the Bluetooth module or the wireless communication module is turned off, so as to avoid waste of traffic of the master device 10.

Figure 20:
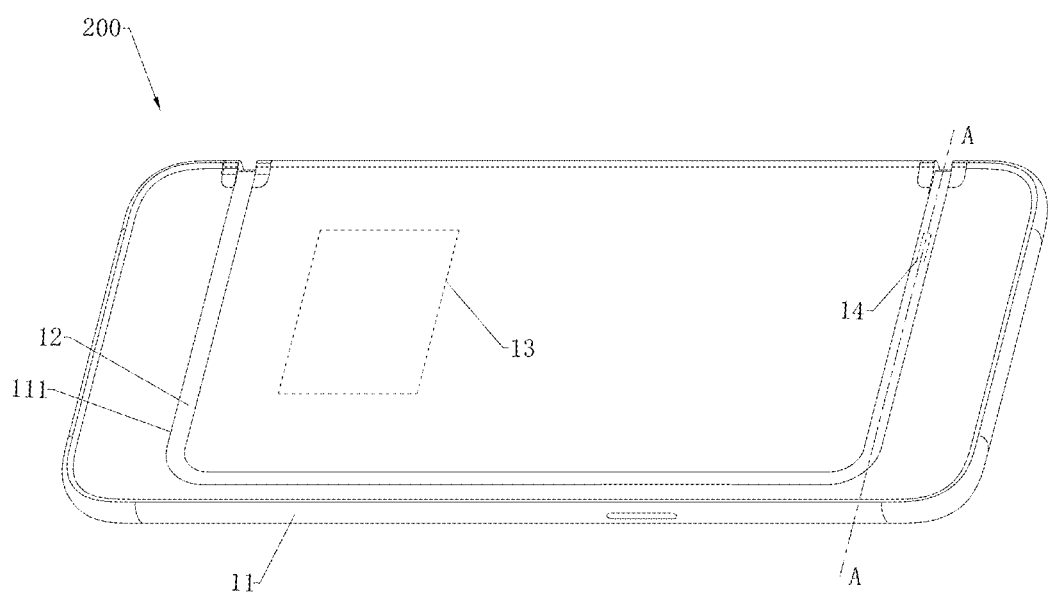
FIG. 20 is a schematic structural diagram illustrating another implementation of the mobile terminal according to the embodiments of the present disclosure.

Referring to FIG. 20, a mobile terminal 200 is provided by the embodiments of the disclosure. The mobile terminal 200 includes a housing 11, a bracket 12, a master controller 13 and a switch assembly 14. The housing 11 is provided with a groove 111 configured to receive the bracket. The bracket 12 is capable of being rotated into or out of the groove 111 relative to the housing 11. The master controller 13 is provided inside the housing 11. The switch assembly 14 is connected with the master controller 13. The switch assembly 14 is arranged in the housing 11 and faces directly the groove 111. It can be understood that, the switch assembly 14 can be a photoelectric sensor, a Hall sensor, or a key switch. For the specific arrangements, reference may be made to the first mobile terminal 100 of the present disclosure.

When the bracket 12 is rotated out of the groove 111 relative to the housing 11, and the angle of rotation meets a first angle, the switch assembly 14 generates a first signal and sends the first signal to the master controller 13. The master controller 13 is configured to control, according to the first signal, at least one component of the mobile terminal 200 to be switched to a first usage state. With regard to the angle of rotation α, reference may be made to the related contents of the above embodiments, which will not be repeated here.

Further, when the bracket 12 is rotated out of the groove 111 relative to the housing 11, and the angle of rotation meets a second angle, the switch assembly 14 generates a second signal and sends the second signal to the master controller 13. The master controller 13 is configured to control, according to the second signal, at least one component of the mobile terminal 200 to be switched to a second usage state, where the second usage state is different from the first usage state.

It is understandable that, in the case where the bracket 12 is rotated out of the groove 111 relative to the housing 11, at least one component of the mobile terminal 200 is switched to the first usage state when the angle of rotation α meets the first angle, and the at least one component of the mobile terminal 200 is switched to the second usage state when the angle of rotation α meets the second angle. In this way, when the user uses the mobile terminal 200, by taking different angles of rotation α by which the bracket 12 is rotated out of the groove 111 relative to the housing 11, the switch assembly 14 can be caused to generate different signals and sends the generated signals to the master controller 13, and the master controller 13 can be caused to control, according to the different signals, the usage state of at least one component of the mobile terminal 200. Accordingly, the functions of the mobile terminal 200 are more diversified, and a better user experience of the mobile terminal 200 is provided.

Further, the mobile terminal 200 includes a wireless communication module, such as a Bluetooth module or a WIFI communication module. When the master controller 13 receives the first signal, the master controller 13 controls the Bluetooth module or the wireless communication module to be turned on. It is understandable that, when the Bluetooth module or the wireless communication module is turned on, a slave device 20 can communicate with the mobile terminal 200 to realize data transmission therebetween. When the master controller 13 receives the second signal, the master controller 13 controls the Bluetooth module or the wireless communication module to be turned off, so as to avoid waste of traffic of the mobile terminal 200.

A method for controlling a mobile terminal is provided by the embodiments of the disclosure. Referring to FIG. 20 again, the mobile terminal 200 includes a housing 11, a bracket 12, a master controller 13, and a switch assembly 14. The housing 11 is provided with a groove 111 configured to receive the bracket. The bracket 12 is capable of being rotated into or out of the groove 111 relative to the housing 11. The master controller 13 is provided inside the housing 11. The switch assembly 14 is connected with the master controller 13. The switch assembly 14 is arranged in the housing 11 and faces directly the groove 111. It can be understood that, the switch assembly 14 can be a photoelectric sensor, a Hall sensor, or a key switch. With regard to the specific arrangements, reference may be made to the first mobile terminal 100 of the embodiments of the present disclosure.

The method includes operations as follows.

When the bracket 12 is rotated out of the groove 111 relative to the housing 11 and an angle of rotation α meets a first angle, the switch assembly 14 generates a first signal, and the master controller 13 receives the first signal.

The master controller 13 controls, according to the first signal, at least one component of the mobile terminal 200 to be switched to a first usage state.

Further, the method includes operations as follows.

When the bracket 12 is rotated out of the groove 111 relative to the housing 11 and the angle of rotation α meets a second angle, the switch assembly 14 generates a second signal, and the master controller 13 receives the second signal.

The master controller 13 controls, according to the second signal, at least one component of the mobile terminal 200 to be switched to a second usage state, where the second usage state is different from the first usage state.

Further, the method includes operations as follows. The mobile terminal includes a wireless communication module, such as a Bluetooth module or a WIFI communication module.

In the first usage state, the Bluetooth module or the wireless communication module is turned on. In the second usage state, the Bluetooth module or the wireless communication module is turned off.

It can be understood that, most of the specific implementations of the method for controlling the mobile terminal in this embodiment are substantially the same as those mentioned in the above embodiments, the specific details may be referred to the above-mentioned embodiments, which will not be repeated here.

The foregoing are optional embodiments of this disclosure. It should be noted that, several improvements and modifications can also be made by those of ordinary skill in the art without departing from the principle of this disclosure, and these improvements and modifications should also be regarded as falling within the scope of protection of this disclosure.

What is claimed is:

1. A mobile terminal, comprising a master device and a slave device, wherein the slave device is detachably installed on the master device, the master device comprises a housing, a bracket, a master controller and a switch assembly, the housing is provided with a groove configured to receive the bracket, the bracket is capable of being rotated into or out of the groove relative to the housing, the master controller is arranged inside the housing, the switch assembly is connected with the master controller, and the switch assembly is arranged in the housing and faces the groove;

the switch assembly is configured to generate a first signal and send the first signal to the master controller, when the bracket is rotated out of the groove relative to the housing and an angle of rotation of the bracket meets a first angle; and the master controller is configured to control, according to the first signal, at least one component of the master device to be switched to a first usage state;

wherein the at least one component of the master device comprises a keyboard, the groove is in a U-shape, and the keyboard is located in an area enclosed by the groove.

2. The mobile terminal as claimed in claim 1, wherein the switch assembly is configured to generate a second signal and send the second signal to the master controller, when the bracket is rotated out of the groove relative to the housing and the angle of rotation of the bracket meets a second angle, the second angle being smaller than the first angle; and the master controller is configured to control, according to the second signal, the at least one component of the master device to be switched to a second usage state, and the second usage state is different from the first usage state.

3. The mobile terminal as claimed in claim 2, wherein the first usage state is an ON state, and the second usage state is an OFF state.

4. The mobile terminal as claimed in claim 2, wherein the keyboard is connected with the master controller and arranged on an outside of the housing;

the master controller is configured to control the keyboard to be powered on upon receiving the first signal, and control the keyboard to be powered off upon receiving the second signal.

5. The mobile terminal as claimed in claim 4, wherein the slave device is configured to establish a communication with the master device when the master controller receives the first signal, so as to enable the slave device to receive an input signal of the keyboard.

6. The mobile terminal as claimed in claim 5, wherein the slave device comprises a display screen, the slave device is detachably installed on the bracket, and the display screen is configured to display information in response to the input signal of the keyboard in the first usage state.

7. The mobile terminal as claimed in claim 2, wherein the master device comprises a Bluetooth module or a WIFI communication module, and the master controller controls the Bluetooth module or the WIFI communication module to be turned on upon receiving the first signal, and controls the Bluetooth module or the WIFI communication module to be turned off upon receiving the second signal.

8. The mobile terminal as claimed in claim 2, wherein the housing is provided with a light-transmitting part, the switch assembly comprises a photoelectric sensor, and the photoelectric sensor faces the light-transmitting part directly;

the angle of rotation of the bracket is determined as the first angle, when the bracket is rotated out of the groove relative to the housing and the photoelectric sensor receives external light passing through the light-transmitting part; and the angle of rotation of the bracket is determined as the second angle, when the bracket is rotated out of the groove relative to the housing and the light-transmitting part is blocked by the bracket.

9. The mobile terminal as claimed in claim 1, wherein the housing is provided with a receiving recess on a same surface as the groove, the groove is located within the receiving recess, and when the bracket is rotated into the groove relative to the housing, the slave device is at least partially received in the receiving recess of the master device.

10. The mobile terminal as claimed in claim 8, wherein the groove is provided with a light-transmitting through hole to define the light-transmitting part, the housing is provided with a light-transmitting member, and the light-transmitting member is at least partially received in the light-transmitting through hole.

11. The mobile terminal as claimed in claim 8, wherein the photoelectric sensor comprises a transmitting portion and a receiving portion spaced apart from each other, the transmitting portion is configured to emit, in a first light environment, light to propagate towards an outside of the housing through the light-transmitting part;

the receiving portion is configured to receive light that is emitted from the transmitting portion and reflected back by the bracket and generate the second signal, when the bracket is rotated out of the groove relative to the housing with the angle of rotation being the second angle, and the transmitting portion is enabled to emit the light; and the receiving portion is further configured to generate the first signal, when the bracket is rotated out of the groove relative to the housing with the angle of rotation being the first angle, and the transmitting portion is enabled to emit the light.

12. The mobile terminal as claimed in claim 11, wherein the master device comprises an anti-light-interference component, the anti-light-interference component is located between the transmitting portion and the receiving portion, and the anti-light-interference component is configured to block light emitted by the transmitting portion towards the outside of the housing from being reflected by the housing to the receiving portion and received by the receiving portion.

13. The mobile terminal as claimed in claim 2, wherein the switch assembly comprises a Hall sensor, and the bracket is provided with a magnetic part,
  the angle of rotation of the bracket is determined as the first angle, when the bracket is rotated out of the groove and a Hall voltage induced by a Hall effect between the magnetic part and the Hall sensor is out of a preset Hall voltage range; and
  the angle of rotation of the bracket is determined as the second angle, when the bracket is rotated out of the groove and the Hall voltage induced by the Hall effect between the magnetic part and the Hall sensor is within the preset Hall voltage range.

14. The mobile terminal as claimed in claim 2, wherein the switch assembly comprises a key switch,
  the angle of rotation of the bracket is determined as the first angle, when the bracket is rotated out of the groove relative to the housing and a pressure applied by the bracket to the key switch is less than or equal to a preset pressure; and
  the angle of rotation of the bracket is determined as the second angle, when the bracket is rotated out of the groove relative to the housing and the pressure applied by the bracket to the key switch is greater than the preset pressure.

15. The mobile terminal as claimed in claim 1, wherein the bracket comprises a supporting portion and a first rotating portion, the supporting portion comprises a first arm and a second arm connected and perpendicular to each other, a shape defined by the first arm and the second arm matches a shape of the groove, one end of the first rotating portion is connected to an end of the first arm, and the other end of the first rotating portion is rotatably connected to a groove wall at an end of the groove, to enable the supporting portion to be rotated into or out of the groove.

16. The mobile terminal as claimed in claim 15, wherein the supporting portion further comprises a third arm and the bracket further comprises a second rotating portion, the third arm is arranged opposite to the first arm, and one end of the third arm is connected to an end of the second arm away from the first arm;
  one end of the second rotating portion is connected with the other end of the third arm away from the second arm, and the other end of the second rotating portion is rotatably connected to a groove wall at the other end of the groove.

17. The mobile terminal as claimed in claim 16, wherein the master device comprises a bracket base, the bracket base is fastened onto the housing and fixed at each end of the groove, and the other end of each of the first rotating portion and the second rotating portion is rotatably connected to the bracket base,
  the end of each of the first rotating portion and the second rotating portion that is connected to the bracket base comprises a sliding surface and a position-limiting surface, the sliding surface is arc-shaped, the position-limiting surface is planar, the position-limiting surface is connected to one end of the sliding surface, the sliding surface is configured to slide with respect to a planar outer surface of the bracket base during a process that the bracket is rotated out of the groove, and the position-limiting surface is configured to abut against the planar outer surface of the bracket base and stop the rotation of the bracket when the angle of rotation of the bracket reaches a preset angle threshold, the preset angle threshold being equal to or larger than the first angle.

18. A method for controlling a mobile terminal, wherein the mobile terminal comprises a master device and a slave device, the slave device is detachably installed on the master device, the master device comprises a housing, a bracket, a master controller and a switch assembly, the housing is provided with a groove configured to receive the bracket, the bracket is capable of being rotated into or out of the groove relative to the housing, the master controller is arranged inside the housing, the switch assembly is connected with the master controller, and the switch assembly is arranged in the housing and faces the groove, the method comprises:
  generating a first signal by the switch assembly, when the bracket is rotated out of the groove relative to the housing and an angle of rotation of the bracket meets a first angle;
  receiving the first signal by the master controller; and
  controlling by the master controller, according to the first signal, at least one component of the master device to be switched to a first usage state;
  wherein the at least one component of the master device comprises a keyboard, the groove is in a U-shape, and the keyboard is located in an area enclosed by the groove.

19. A mobile terminal, comprising a housing, a bracket, a master controller and a switch assembly, the housing is provided with a groove configured to receive the bracket, and the bracket is capable of being rotated into or out of the groove relative to the housing, the master controller is arranged inside the housing, the switch assembly is connected with the master controller, and the switch assembly is arranged in the housing and faces the groove;
  the switch assembly is configured to generate a first signal and send the first signal to the master controller, when the bracket is rotated out of the groove relative to the housing and an angle of rotation of the bracket meets a first angle, and
  the master controller is configured to control, according to the first signal, at least one component of the mobile terminal to be switched to a first usage state;
  wherein when the angle of rotation of the bracket meets the first angle, the bracket stands sidewards the housing, and a slave device can be placed and supported on the bracket;
  wherein when the bracket is rotated into the groove, the slave device on the bracket is at least partially received in the housing of the mobile terminal;
  wherein the bracket comprises a supporting portion and a first rotating portion, one end of the first rotating portion is connected to an end of the supporting portion, and the other end of the first rotating portion is rotatably connected to a groove wall at an end of the groove, to enable the supporting portion to be rotated into or out of the groove;
  wherein the mobile terminal comprises a bracket base, the bracket base is fastened onto the housing and fixed at each end of the groove, and the other end of the first rotating portion is rotatably connected to the bracket base; and wherein the other end of the first rotating portion comprises a sliding surface and a position-limiting surface, the sliding surface is arc-shaped, the position-limiting surface is planar, the position-limiting surface is connected to one end of the sliding surface, the sliding surface is configured to slide with respect to a planar outer surface of the bracket base during a process that the bracket is rotated out of the groove, and the position-limiting surface is configured to abut against the planar outer surface of the bracket base and stop the rotation of the bracket when the angle of rotation of the bracket reaches a preset angle threshold, the preset angle threshold being equal to or larger than the first angle.

* * * * *